United States Patent
Yebka et al.

(10) Patent No.: US 10,680,450 B2
(45) Date of Patent: Jun. 9, 2020

(54) DEVICES AND METHODS TO DISCHARGE BATTERY

(71) Applicant: Lenovo (Singapore) Pte. Ltd., New Tech Park (SG)

(72) Inventors: Bouziane Yebka, Apex, NC (US); Jeremy Robert Carlson, Cary, NC (US); Tin-Lup Wong, Chapel Hill, NC (US); Philip John Jakes, Durham, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 392 days.

(21) Appl. No.: 14/874,950

(22) Filed: Oct. 5, 2015

(65) Prior Publication Data

US 2017/0098948 A1  Apr. 6, 2017

(51) Int. Cl.
*H02J 7/00* (2006.01)

(52) U.S. Cl.
CPC ........... *H02J 7/0029* (2013.01); *H02J 7/0031* (2013.01)

(58) Field of Classification Search
CPC ........ H02J 7/0016; Y02E 60/12; H01M 10/44
USPC .................................................. 320/118, 135
See application file for complete search history.

(56) References Cited

U.S. PATENT DOCUMENTS

| | | | |
|---|---|---|---|
| 5,479,084 A * | 12/1995 | Satsuma | H01M 10/44 320/136 |
| 5,751,217 A | 5/1998 | Kchao et al. | |
| 5,920,180 A * | 7/1999 | Kim | H02J 7/0073 320/128 |
| 6,288,521 B1 | 9/2001 | Meador | |
| 6,531,847 B1 | 3/2003 | Tsukamoto et al. | |
| 8,659,267 B2 * | 2/2014 | Yun | H02J 7/0031 320/116 |
| 2001/0028238 A1 | 10/2001 | Nakamura et al. | |
| 2001/0035740 A1 | 11/2001 | Palanisamy | |
| 2004/0128089 A1 | 7/2004 | Barsoukov et al. | |
| 2005/0001710 A1* | 1/2005 | Mukai | H01H 37/761 337/297 |
| 2005/0170256 A1* | 8/2005 | Cummings | H01M 4/5825 429/322 |
| 2008/0116851 A1* | 5/2008 | Mori | H01M 2/34 320/134 |
| 2010/0085015 A1 | 4/2010 | Hamaguchi et al. | |
| 2011/0019326 A1* | 1/2011 | Odaohhara | H02J 7/0031 361/104 |
| 2011/0089907 A1 | 4/2011 | Bhardwaj et al. | |
| 2011/0270559 A1 | 11/2011 | Christophersen et al. | |

(Continued)

OTHER PUBLICATIONS

Bouziane Yebka, Joseph Anthony Holung, Tin-Lup Wong, Philip John Jakes, "Shorting Battery to Ground Responsive to Battery Impedance Reaching Threshold", file history of related pending U.S. Appl. No. 14/963,532, filed Dec. 9, 2015.

(Continued)

*Primary Examiner* — Richard Isla
*Assistant Examiner* — Johali A Torres Ruiz
(74) *Attorney, Agent, or Firm* — John M. Rogitz; John L. Rogitz

(57) ABSTRACT

Battery malfunction is limited by accelerating battery discharge once battery voltage reaches a low voltage threshold. This can be done programmatically and/or using a hardware arrangement that shorts the battery to ground when the low voltage threshold is reached.

20 Claims, 7 Drawing Sheets

(56) References Cited

U.S. PATENT DOCUMENTS

| | | | |
|---|---|---|---|
| 2012/0139494 A1* | 6/2012 | Kim | H02J 7/0029 320/128 |
| 2012/0153902 A1 | 6/2012 | Yebka et al. | |
| 2012/0274335 A1* | 11/2012 | Matsuura | H01M 10/425 324/537 |
| 2012/0313568 A1 | 12/2012 | Paluszek et al. | |
| 2013/0181681 A1* | 7/2013 | Mukai | H02J 7/0031 320/134 |
| 2013/0249494 A1* | 9/2013 | Ju | H02J 7/0029 320/134 |
| 2013/0307476 A1 | 11/2013 | Darragh et al. | |
| 2014/0019789 A1 | 1/2014 | Bhardwaj et al. | |
| 2014/0342193 A1 | 11/2014 | Mull et al. | |
| 2015/0061572 A1* | 3/2015 | Ju | H02J 7/0063 320/107 |
| 2015/0200537 A1* | 7/2015 | Kang | H02H 7/18 320/134 |
| 2015/0258341 A1 | 9/2015 | Ternes et al. | |
| 2015/0340899 A1 | 11/2015 | Bilezikjian et al. | |
| 2015/0357845 A1* | 12/2015 | Railey | B63B 35/7943 320/136 |
| 2016/0064968 A1* | 3/2016 | Lee | H02J 7/0016 320/118 |
| 2016/0097820 A1* | 4/2016 | Thompson | G01R 31/3675 320/134 |
| 2016/0149275 A1* | 5/2016 | Minamiura | H01M 10/443 320/107 |
| 2016/0149423 A1* | 5/2016 | Liu | H02J 7/0029 320/134 |
| 2016/0201634 A1* | 7/2016 | Kim | F02N 11/0862 320/136 |
| 2017/0077717 A1 | 3/2017 | Lundgren et al. | |

OTHER PUBLICATIONS

Bouziane Yebka, Joseph Anthony Holung, Tin-Lup Wong, Philip John Jakes, "Shorting Battery to Ground Responsive to Battery Impedance Reaching Threshold", related U.S. Appl. No. 14/963,532, Non-Final Office Action dated Dec. 15, 2017.

Larry Glenn Estes, Jeremy Robert Carlson, Bouziane Yebka, "Systems and Methods to Use Cell Balancing Resistor(s) of Battery Pack to Reduce Charge Level of Battery Cells", file history of related application serial No. filed Apr. 5, 2018.

Bouziane Yebka, Joseph Anthony Holung, Tin-Lup Wong, Philip John Jakes, "Shorting Battery to Ground Responsive to Battery Impedance Reaching Threshold", related U.S. Appl. No. 14/963,532, Applicant's response to Non-Final Office Action filed Jan. 2, 2018.

Bouziane Yebka, Joseph Anthony Holung, Tin-Lup Wong, Philip John Jakes, "Shorting Battery to Ground Responsive to Battery Impedance Reaching Threshold", related U.S. Appl. No. 14/963,532, Final Office Action dated May 31, 2019.

Bouziane Yebka, Joseph Anthony Holung, Tin-Lup Wong, Philip John Jakes, "Shorting Battery to Ground Responsive to Battery Impedance Reaching Threshold", related U.S. Appl. No. 14/963,532, Applicant's response to Non-Final Office Action filed Jan. 29, 2019.

Bouziane Yebka, Joseph Anthony Holung, Tin-Lup Wong, Philip John Jakes, "Shorting Battery to Ground Responsive to Battery Impedance Reaching Threshold", Non-Final Office Action dated Dec. 12, 2018.

* cited by examiner

US 10,680,450 B2

DEVICES AND METHODS TO DISCHARGE BATTERY

FIELD

The present application relates generally to devices and methods to discharge a battery.

BACKGROUND

Rechargeable Lithium-ion batteries are used in notebook computers, wireless telephones, and other portable electronic equipment because of their low cost and high-energy storage capability. Such batteries are typically made in "pouch" format (e.g., in which the active materials are folded and contained in a sealed polymeric pouch), as well as "jelly roll" format (e.g., in which the active materials are rolled into a cylindrical shape).

Both types of batteries can pose safety hazards under high temperature operating conditions, internal gas buildup conditions, etc. that may arise under extreme charge or discharge of the battery. Furthermore, the battery can swell and break its casing under such conditions as well as others, such as a relatively slow self-discharges over a period of time.

SUMMARY

Accordingly, in one aspect, a device includes system components, a battery which supplies power to the system components, and circuitry to accelerate battery discharge once voltage of at least one cell in the battery reaches a low voltage threshold.

In another aspect, a method includes providing system components, providing a battery which supplies power to the system components, and providing circuitry that initiates a discharge of the battery once a voltage in the battery reaches a low voltage threshold.

In still another aspect, a battery includes at least one battery cell and circuitry that shorts the battery to ground responsive to voltage of at least one cell in the battery reaching a low voltage threshold.

The details of present principles, both as to their structure and operation, can best be understood in reference to the accompanying drawings, in which like reference numerals refer to like parts, and in which:

DETAILED DESCRIPTION

Figure 1:
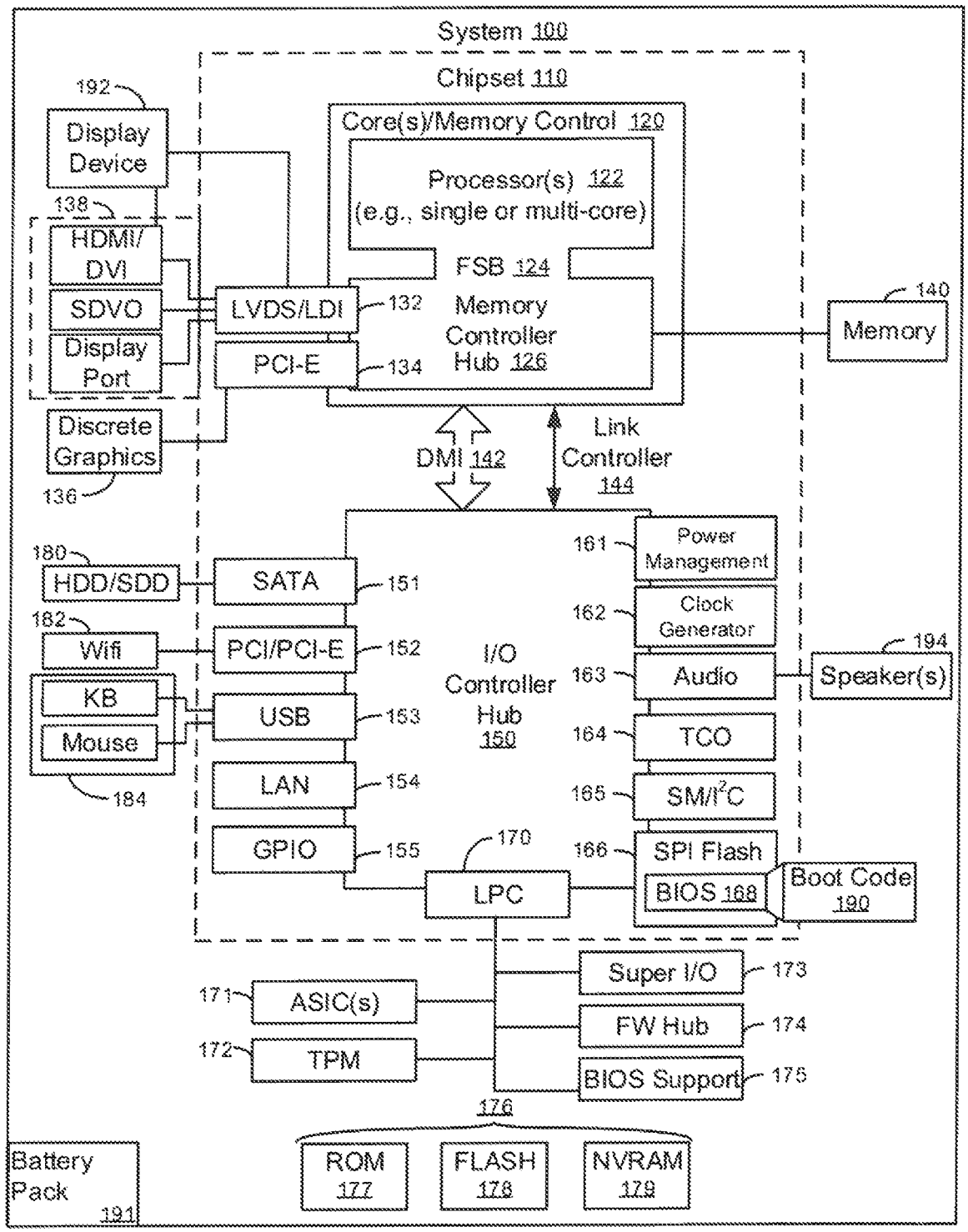
FIG. 1 is a block diagram of an example system in accordance with present principles.

As understood herein, as a safety feature many portable devices automatically deenergize when battery voltage reaches a low voltage threshold. For example, a device may deenergize when the battery discharges to five percent of its full energy storage capacity, which amounts to three volts in some examples. A battery in this state can remain alive quite some time until slow trickle self-discharge causes battery voltage to reach an even lower voltage threshold, at which a protection circuit internal to the battery operates to stop further slow trickle self-discharge as disclosed herein and, in at least some instances, render the battery unserviceable. Thus, present principles can help avoid battery swelling that would otherwise occur if self-discharge continued beyond the even lower voltage threshold.

With respect to any computer systems discussed herein, a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple, Google, or Microsoft. A Unix or similar such as Linux operating system may be used. These operating systems can execute one or more browsers such as a browser made by Microsoft or Google or Mozilla or other browser program that can access web applications hosted by the Internet servers over a network such as the Internet, a local intranet, or a virtual private network.

As used herein, instructions refer to computer-implemented steps for processing information in the system. Instructions can be implemented in software, firmware or hardware; hence, illustrative components, blocks, modules, circuits, and steps are set forth in terms of their functionality.

A processor may be any conventional general purpose single- or multi-chip processor that can execute logic by means of various lines such as address lines, data lines, and control lines and registers and shift registers. Moreover, any logical blocks, modules, and circuits described herein can be implemented or performed, in addition to a general purpose processor, in or by a digital signal processor (DSP), a field programmable gate array (FPGA) or other programmable logic device such as an application specific integrated circuit (ASIC), discrete gate or transistor logic, discrete hardware components, or any combination thereof designed to perfirm the functions described herein. A processor can be implemented by a controller or state machine or a combination of computing devices.

Any software and/or applications described by way of flow charts and/or user interfaces herein can include various sub-routines, procedures, etc. It is to be understood that logic divulged as being executed by, e.g., a module can be redistributed to other software modules and/or combined together in a single module and/or made available in a shareable library.

Logic when implemented in software, can be written in an appropriate language such as but not limited to C# or C++, and can be stored on or transmitted through a computer-readable storage medium (e.g., that may not be a transitory signal) such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and twisted pair wires. Such connections may include wireless communication connections including infrared and radio.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B. and C together, etc.

"A system having one or more of A, B, and C" (likewise "a system having one or more of A, B, or C" and "a system having one or more of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown. Note that in some embodiments the system 100 may be a desktop computer system, such as one of the ThinkCentre® or ThinkPad® series of personal computers sold by Lenovo (US) Inc. of Morrisville, N.C. or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100. Also, the system 100 may be, e.g., a game console such as XBOX® or Playstation®, and/or the system 100 may include a wireless telephone, notebook computer, and/or other portable computerized device.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMDA, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the conventional "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (x16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet a WAN, a LAN, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes BIOS 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 may provide for communication with various devices, networks, etc. For example, where used, the SATA interface 151 provides for reading, writing or reading and writing information on one or more drives 180 such as HDDs, SDDs or a combination thereof, but in any case the drives 180 are understood to be, e.g., tangible computer readable storage mediums that may not be transitory signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

Furthermore, the system 100 may also include at least one battery pack 191 comprising at least one battery. The battery pack 191 may be in jelly roll format or pouch cell format in which the strip(s) of active material are folded, and in either case may be a Lithium ion battery. The battery pack 191 is electrically coupled to and powers the system 100, and can also be electrically coupled to at least one charge receiver for receiving a charge. The receiver can include at least one circuit configured for receiving power (e.g., from a wall outlet) and doing at least one of: providing current to the system 100 to power it and providing current to the battery pack 191 to charge at least one battery in the pack 191.

Additionally, though now shown for clarity, in some embodiments the system 100 may include a gyroscope for sensing and/or measuring the orientation of the system 100 and providing input related thereto to the processor 122, an accelerometer for sensing acceleration and/or movement of the system 100 and providing input related thereto to the processor 122, an audio receiver/microphone providing input to the processor 122 based on, e.g., a user providing audible input to the microphone, and a camera for gathering one or more images and providing input related thereto to the processor 122.

The camera may be a thermal imaging camera, a digital camera such as a webcam, a three-dimensional (3D) camera, and/or a camera otherwise integrated into the system 100 and controllable by the processor 122 to gather pictures/images and/or video. Still further, and also not shown for clarity, the system 100 may include a GPS transceiver that is configured to receive geographic position information from at least one satellite and provide the information to the processor 122. However, it is to be understood that another suitable position receiver other than a GPS receiver may be used in accordance with present principles to determine the location of the system 100.

It is to be understood that an example client device or other machine/computer may include fewer or more features than shown on the system 100 of FIG. 1. In any case, it is to be understood at least based on the foregoing that the system 100 is configured to undertake present principles.

Figure 2:
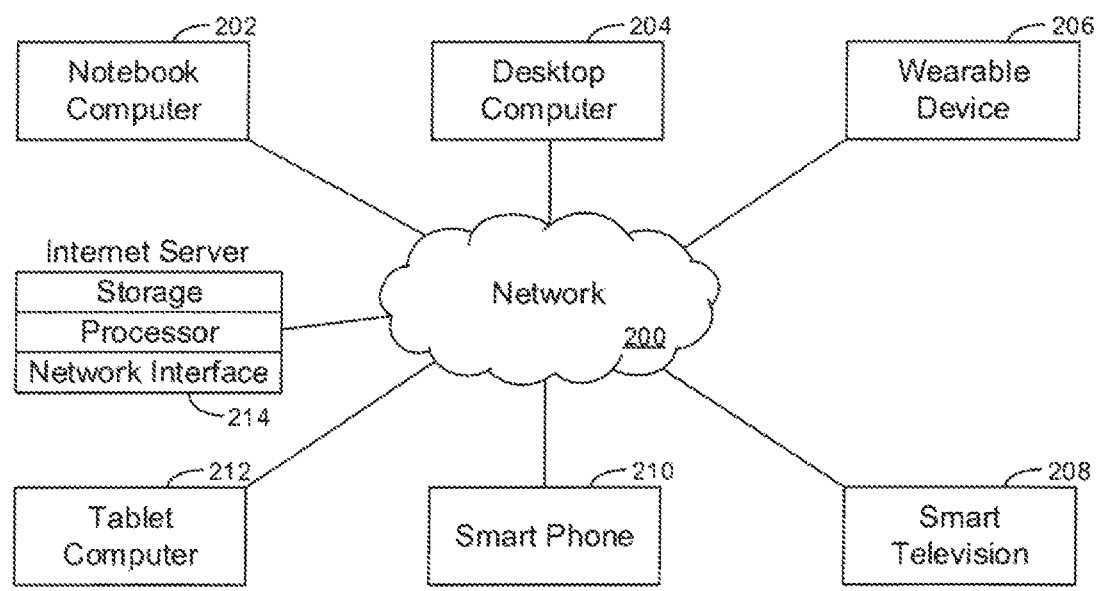
FIG. 2 is a block diagram of a network of devices in accordance with present principles.

Turning now to FIG. 2, example devices are shown communicating over a network 200 such as the Internet in accordance with present principles. It is to be understood that each of the devices described in reference to FIG. 2 may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, and a server 214 such as an Internet server that may provide cloud storage accessible to the devices 202-212. It is to be understood that the devices 202-214 are configured to communicate with each other over the network 200 to undertake present principles.

Figure 3:
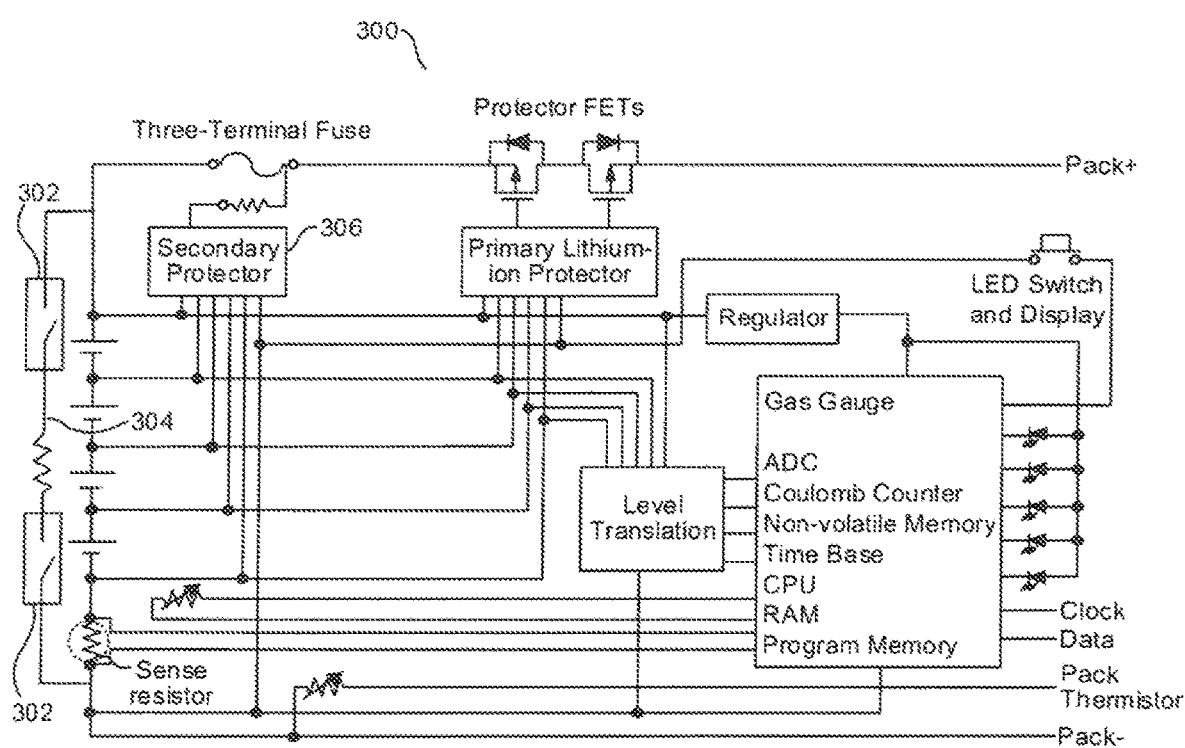
FIGS. 3 and 4 are block diagrams of example battery circuitry in accordance with present principles.

Examples of circuitry will now be described for, e.g., stopping slow trickle self-discharge and shorting a battery to ground once a low voltage threshold has been reached to thus limit the potential for undesirable battery swelling such as at the end of life of the battery. Referring first to FIG. 3, it shows an example block diagram of battery circuitry 300 including hardware elements to limit end of life swelling of a battery. Thus, in addition to other battery components such as protectors, a gas gauge, a regulator, and fuses, the circuitry 300 includes at least one, and optionally plural, switches 302 which may be, in some example embodiments, field effect transistors (FETs). The circuitry 300 may also include a resistor 304 which, when two switches 302 are used such as in the example embodiment shown, is between and connected to the two switches 302.

Notwithstanding, whether one or plural switches are used, the switch(es) 302 and resistor 304 combination are understood to form a path from the battery cells to ground when the switch(es) 302 is actuated to permit current to flow to ground to discharge the battery, e.g., entirely or near entirely.

The switch(es) 302 may be actuated based on a signal(s) from one or more comparators in the secondary protector 306 that monitor voltages of individual cells in the battery. In example embodiments, the comparators are configured to output a signal to the switch(es) 302 to complete the path to ground responsive to voltage of any one cell being detected as reaching a low voltage threshold. Accordingly, since sometimes a single cell in a series connected stack can create undesirable battery swelling even if the average voltage across all cells is above the threshold, in example embodiments the switch(es) 302 may be actuated to complete a path to ground responsive to voltage of any one cell reaching a low voltage threshold.

Before moving on to the description of other figures, it is to be understood that the batteries disclosed herein may operate variously per different low voltage thresholds. For instance, while the low voltage threshold (such as, e.g., two and a half volts) discussed above in reference to FIG. 3 may be used for a comparator to generate and transmit a signal to the switch(es) 302 to complete a path to ground, there may also be a relatively higher low voltage threshold (such as, e.g., three volts) used that, when identified by the battery circuitry as being reached (e.g., for any one cell, as identified by the battery's gas gauge), causes the battery circuitry to generate a signal to a processor outside the battery but in a device in which the battery is disposed (e.g., to a CPU of a laptop computer, a mobile device, a wearable device, etc.) that the relatively higher low voltage threshold has been reached. That, in turn, may cause the device in which the battery is disposed to execute certain functions, such as a power down of the device to conserve what battery power remains.

Figure 4:
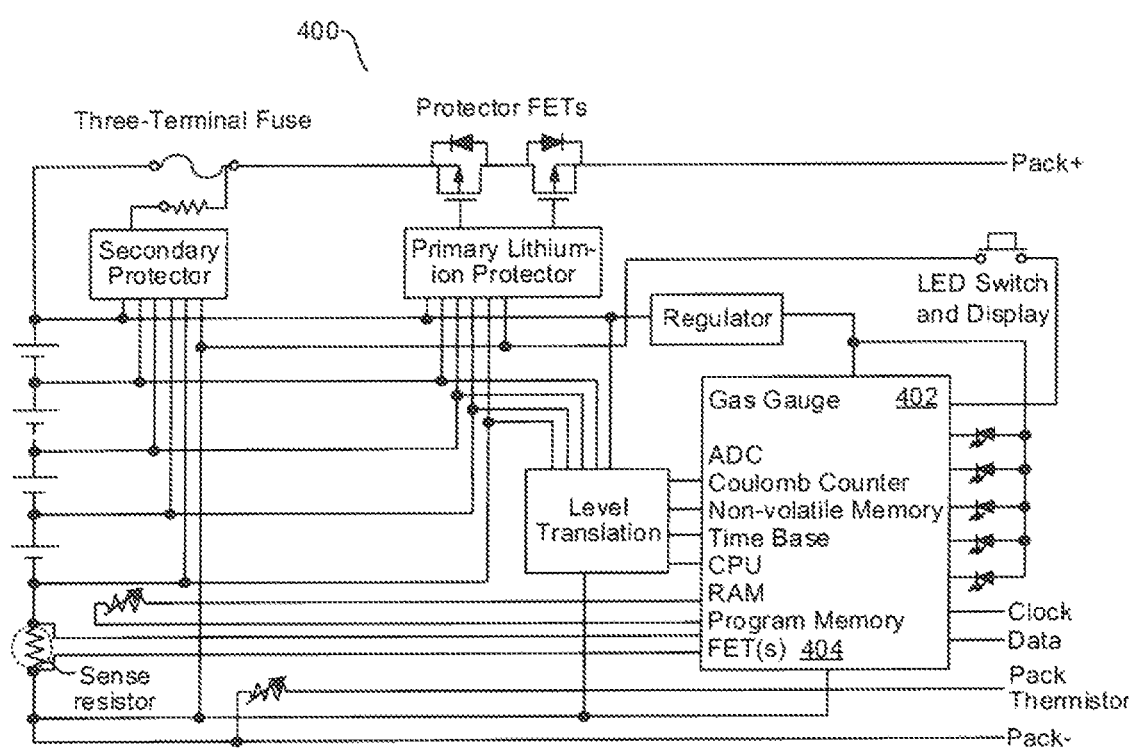

This relatively higher low voltage threshold is thus used to leave available some battery power so that device "housekeeping" may nonetheless be performed while the device is powered off and before the battery is charged again, as may sometimes be done. Furthermore, it allows for reduced battery stress and some acceptable self-discharge to take place. Accordingly, using the relatively higher low voltage threshold, the battery may be managed so that some additional discharge beyond the relatively higher low voltage threshold is permitted (e.g., for use by the device and/or based on battery self-discharge) before reaching the lower low voltage threshold at which the battery shorts to ground in accordance with present principles to thus prevent undesirable battery swelling/damage that would otherwise occur at and/or beyond the lower low voltage threshold as the battery continues to discharge over time without being recharged, Continuing now in reference to FIG. 4, another example will be described of circuitry for accelerating discharge of remaining and/or unused battery power once voltage of at least one cell in the battery reaches a low voltage threshold. FIG. 4 shows a block diagram of battery circuitry 400 including hardware elements that, based on software that is executed, are actuatable to limit end of life swelling of a battery and/or otherwise short the battery to ground to discharge the battery.

The circuitry 400 comprises a battery gas gauge 402 in addition to other battery components such as protectors, a regulator, and fuses. As may be appreciated from FIG. 4, the gas gauge 402 may comprise an analog-to-digital converter (ADC), a coulomb counter, non-volatile memory, a time base, a processor, random access memory (RAM), and program memory. It is to be understood that the ADC may electrically communicate with each battery cell in the battery and provide signals to the processor regarding the voltage of each respective cell.

The gas gauge 402 may also comprise at least one field effect transistor (FET) 404 (or another type of electrical switch), it being recognized that in some embodiments additional FETs in parallel may be included for bleeding current using respective resistors. Notwithstanding, the FET 404 is understood to be connected to a (e.g., balance and/or bleeding) resistor that may be external to the gas gauge 402 but within the circuitry 400, where this resistor is connected to ground or to a system component outside the battery.

Figure 5:
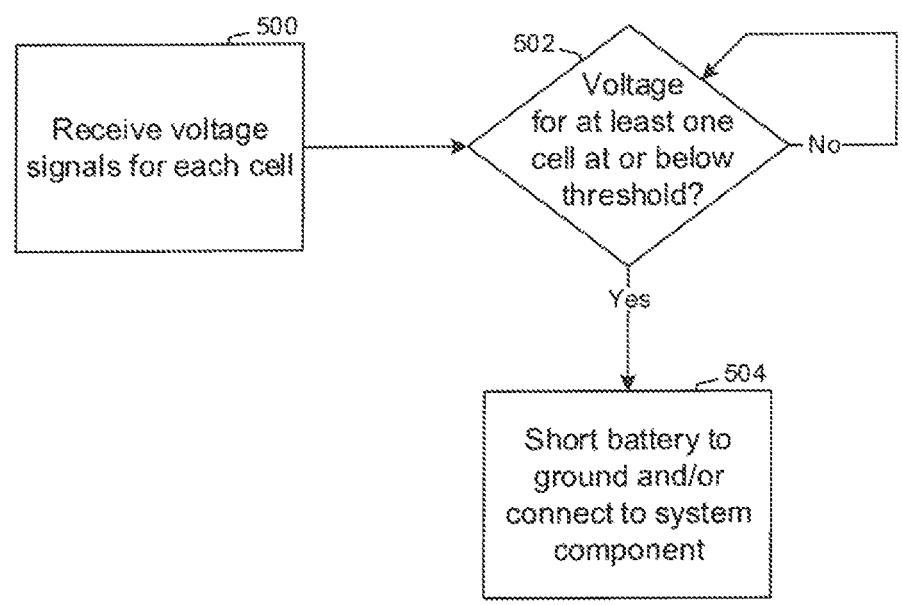
FIG. 5 is a flow chart showing an example algorithm in accordance with present principles.

The processor in the gas gauge 402 may thus execute instructions (e.g., software/firmware) stored in the gas gauge 402 to actuate the FET 404 to complete the path to ground or to the system component. A flow chart showing an example algorithm that may be executed by the processor in the gas gauge is shown in FIG. 5. Beginning at block 500, the logic receives respective signals from the ADC in the gas gauge 402 indicating respective voltages for each cell in the battery in which the gas gauge 402 is disposed. The logic then moves to decision diamond 502, where the logic determines, based on the received signals, whether at least one cell is at and/or below a low voltage threshold at which a battery is to be shorted to ground and/or otherwise have discharge accelerated to "fully" discharged—e.g., discharged so as to no longer hold usable power even is some negligible amount of voltage remains. A negative determination at diamond 502 causes the logic to continue receiving signals and determining whether at least one cell is at and/or below the low voltage threshold at diamond 502.

However, an affirmative determination instead causes the logic to proceed to block 504. At block 504, the logic shorts the battery to ground and/or connects the battery to a system component (e.g., a laptop component outside the battery) to accelerate battery discharge. In example embodiments, the logic may do so at block 504 via the processor actuating the FET 404 of FIG. 4 to open and/or establish a path to the resistor disclosed above (that may be external to the gas gauge 402 but within the circuitry 400), where this resistor is connected to ground, or to a system component, to thus accelerate discharge the battery (e.g., at a rate based on the value of the resistor). Even further, in some example embodiments, the logic may do so at block 504 by actuating plural FETs in parallel in the gas gauge to establish respective paths to respective resistors connected to ground or to a system component to thus accelerate discharge the battery at rates based on the values for the resistors.

Figure 6:
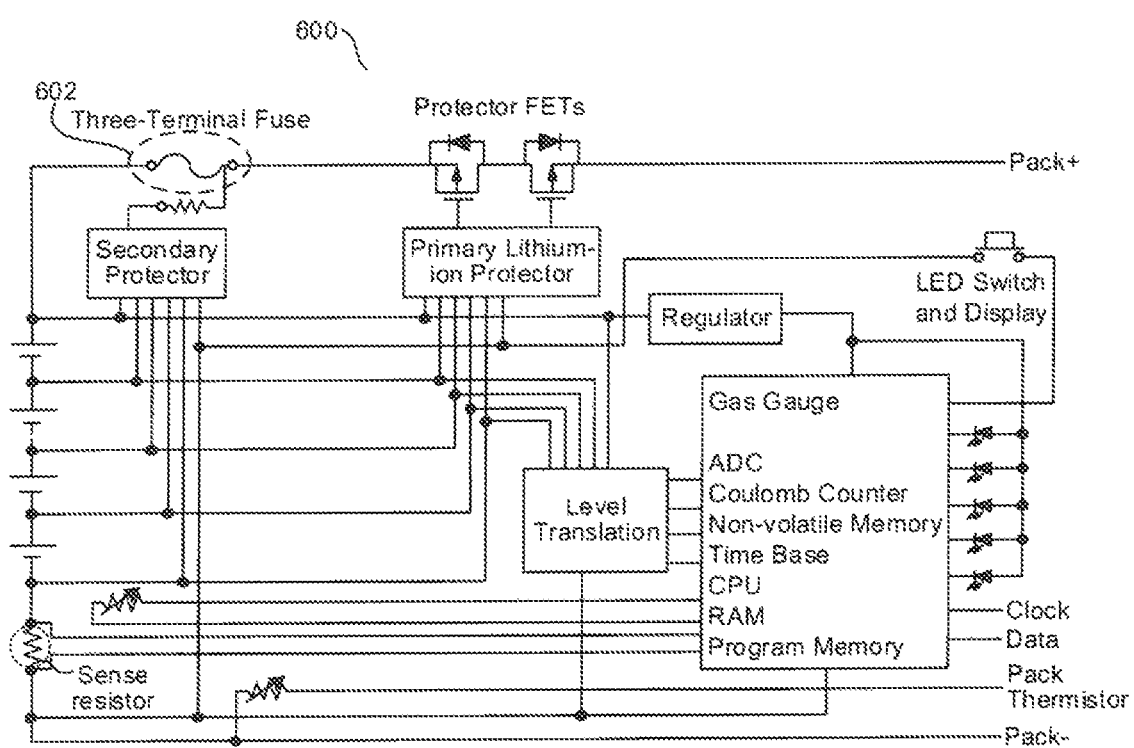
FIG. 6 is a block diagram of example battery circuitry in accordance with present principles.

Continuing the detailed description with reference to FIG. 6, another example will be described of circuitry for accelerating battery discharge once voltage of at least one cell in the battery reaches a low voltage threshold. FIG. 6 shows a block diagram of battery circuitry 600 including battery components such as such as protectors, a regulator, and a gas gauge. Bubble 602 demonstrates a location within the circuitry 600 at which an example fuse in accordance with present principles may be disposed. This fuse is shown in FIGS. 7A and 7B.

Figure 7A:
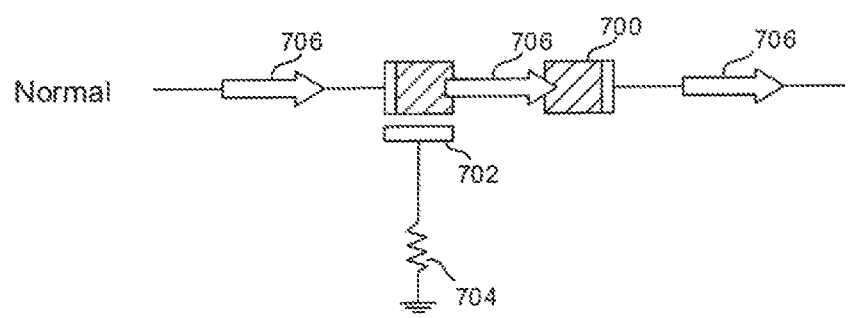
FIGS. 7A and 7B are block diagrams of example electrical components in accordance with present principles.
Figure 7B:
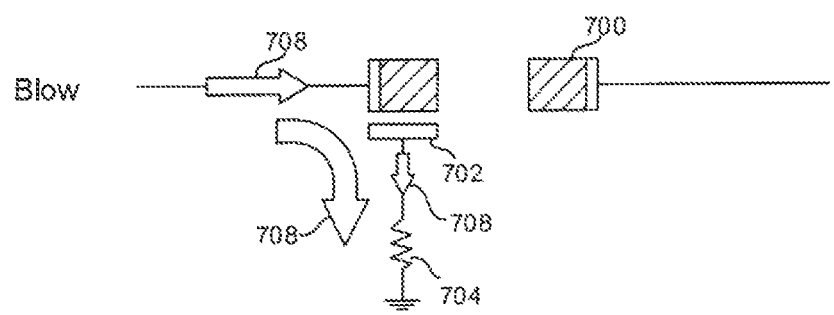

Accordingly, reference is now made to FIGS. 7A and 7B, which are block diagrams of the operation of an example fuse 700 in accordance with present principles. FIGS. 7A and 7B also show that the fuse 700 may comprise a pad/terminal 702 electrically connected to a first resistor 704, where the first resistor 704 is connected to ground (or, in some embodiments, to a system component outside the battery). The resistor 704 may be part of the fuse 700 or external to it.

In example embodiments, the fuse 700 may comprise solder that connects two pads/terminals of the fuse 700 while the fuse 700 is operating under normal conditions and/or is not blown, as represented by arrows 706 in FIG. 7A. However, note that the solder is not shown in FIGS. 7A and 7B for clarity. Also not shown for clarity in FIGS. 7A and 7B is an electrical component such as a second resistor that may be part of the fuse 700. The second resistor is under the solder, contacting the solder, and/or is proximate to the solder to thermally influence the solder. This second resistor is also connected to both the battery's cell stack and system load. Thus, to blow the fuse 700 to accelerate discharge to ground, an FET (which may be controlled by the battery's gas gauge and/or the battery's secondary protector integrated circuit) to ground may be opened, such as responsive to voltage of at least one cell reaching the low voltage threshold at which the battery is to be discharged. When the FET is opened, current is pulled through the second resistor to heat the solder in the fuse 700.

As may be appreciated from FIG. 7B, when enough current is pulled through the second resistor, the second resistor heats the solder at least to the solder's melting point and, as the solder melts, it breaks the electrical connection of the two pads with which it was previously connected to thus blow the fuse 700. The melted solder also contacts the another pad 702 when blowing the fuse to establish an electrical connection between the pad 702 and the pad of the fuse 700 through which current enters the fuse 700 (one of the two pads not shown for clarity but described above). In doing so, the melted solder establishes and/or bridges a path for current to travel from the fuse 700 through resistor 704 and to ground (or to a system component) to accelerate discharge of the battery at the end of the battery's life or otherwise. This path that is established is represented by arrows 708 shown in FIG. 7B.

Generally, it is to be understood that when reference is made to using a system component to accelerate discharge of the battery, this system component may be a component of the device in which the battery is disposed but not within the battery itself. For instance, a fan, an LED, or a resistor in a laptop computer may be turned on, remain on, and/or otherwise continue to use current from the battery cells to accelerate discharge.

It is to also be understood that while present principles may be used to accelerate battery discharge at the end of a battery's life to thus prevent battery swelling as disclosed herein, present principles may also be used in still other instances, such as responsive to other battery malfunctions such as gas pressure and/or temperature thresholds being reached (e.g., under control of the gas gauge and responsive to the threshold being exceeded as determined based on input from one or more pressure/temperature sensors in the battery), responsive to commands received from users to do so (e.g., via the press of a physical button on the battery that opens a switch to ground or via a software command issued through the device in which the battery is disposed to thus control the gas gauge to discharge the battery), responsive to overdischarge of the battery, etc.

While the particular DEVICES AND METHODS TO DISCHARGE BATTERY is herein shown and described in detail, it is to be understood that the subject matter which is encompassed by the present application is limited only by the claims.

What is claimed is:

1. A battery, comprising:
   at least one battery cell; and
   circuitry that shorts the battery to ground responsive to voltage of at least one cell in the battery reaching a low voltage threshold, the circuitry shorting the battery to ground based on actuation of at least one element to melt material within the battery onto at least a first hardware component to establish an electrical connection between the first hardware component and a second hardware component to establish a path for current to travel to complete a path to ground, the first hardware component being different from the second hardware component, the first and second hardware components having a break therebetween prior to the melting of the material onto at least the first hardware component.

2. The battery of claim 1, wherein the circuitry is implemented in hardware, wherein the circuitry is first circuitry, wherein the low voltage threshold is a first low voltage threshold, and wherein the battery comprises second circuitry that stops the battery from supplying power to system components of a device responsive to voltage of at least one cell in the battery reaching a second low voltage threshold, the second low voltage threshold being of a greater voltage amount than the first low voltage threshold.

3. The battery of claim 2, wherein the at least one element comprises a resistor that heats the material.

4. The battery of claim 3, wherein the resistor contacts the material to heat the material.

5. The battery of claim 3, wherein the circuitry comprises a field effect transistor (FET) that opens so that current is provided to the resistor to heat the material.

6. The battery of claim 1, wherein the circuitry is arranged so that based on the material melting a fuse is blown.

7. The battery of claim 1, wherein the material comprises solder.

8. A method, comprising:
   providing a battery having at least one battery cell; and
   providing circuitry that shorts the battery to ground responsive to voltage of at least one cell in the battery reaching a low voltage threshold, the circuitry shorting the battery to ground based on actuation of at least one element to melt material within the battery to establish an electrical connection with a pad to complete a path to ground for current to travel to ground, the path to ground not being completed prior to the melting of the material.

9. The method of claim 8, wherein the circuitry is implemented in hardware, wherein the circuitry is first circuitry, wherein the low voltage threshold is a first low voltage threshold, and wherein the battery comprises second circuitry that stops the battery from supplying power to system components of a device responsive to voltage of at least one cell in the battery reaching a second low voltage threshold, the second low voltage threshold being of a greater voltage amount than the first low voltage threshold.

10. The method of claim 8, wherein the at least one element comprises a resistor that heats the material, and wherein the at least one element is provided as part of the circuitry.

11. The method of claim 10, wherein the resistor contacts the material to heat the material.

12. The method of claim 10, wherein the circuitry comprises a field effect transistor (FET) that opens so that current is provided to the resistor to heat the material.

13. The method of claim 9, wherein the circuitry as provided is arranged so that based on the material melting a fuse is blown.

14. The method of claim 8, wherein the material comprises solder.

15. A device, comprising:
    system components, the system components comprising at least one processor, at least one computer-readable storage medium accessible to the at least one processor, and a display accessible to the at least one processor;
    a battery comprising at least one battery cell; and
    circuitry that shorts the battery to ground responsive to voltage of at least one battery cell in the battery reaching a low voltage threshold, the circuitry shorting the battery to ground based on actuation of at least one element to melt material within the battery from a first hardware component onto a second hardware component to complete a path between the first and second hardware components to ground.

16. The device of claim 15, wherein the at least one element comprises a resistor that heats the material.

17. The device of claim 16, wherein the resistor contacts the material to heat the material.

18. The device of claim 16, wherein the circuitry comprises a field effect transistor (FET) that opens so that current is provided to the resistor to heat the material.

19. The device of claim 15, wherein the circuitry is arranged so that based on the material melting a fuse is blown.

20. The device of claim 15, wherein the material comprises solder.

* * * * *